(12) United States Patent
Ito

(10) Patent No.: US 7,050,048 B2
(45) Date of Patent: *May 23, 2006

(54) COORDINATE INPUT AND DETECTION DEVICE AND INFORMATION DISPLAY AND INPUT APPARATUS

(75) Inventor: Takahiro Ito, Aichi (JP)

(73) Assignee: Ricoh Company, Ltd., Tokyo (JP)

(*) Notice: Subject to any disclaimer, the term of this patent is extended or adjusted under 35 U.S.C. 154(b) by 265 days.

This patent is subject to a terminal disclaimer.

(21) Appl. No.: 10/670,368

(22) Filed: Sep. 26, 2003

(65) Prior Publication Data

US 2004/0061689 A1  Apr. 1, 2004

Related U.S. Application Data

(62) Division of application No. 09/813,991, filed on Mar. 22, 2001, now Pat. No. 6,654,007.

(30) Foreign Application Priority Data

Mar. 31, 2000 (JP) .............................. 2000-096991

(51) Int. Cl.
*G09G 5/00* (2006.01)

(52) U.S. Cl. ................... 345/175; 345/176; 178/18.09; 250/559.29; 359/169; 359/193

(58) Field of Classification Search ................ 345/173, 345/175, 176, 178; 178/18.01, 18.07, 18.09; 250/221, 259.38, 559.29, 559.31; 359/119, 359/193

See application file for complete search history.

(56) References Cited

U.S. PATENT DOCUMENTS

| 4,507,557 | A | 3/1985 | Tsikos |
| 4,710,760 | A | 12/1987 | Kasday |
| 4,713,534 | A | 12/1987 | Masters et al. |
| 6,100,538 | A | 8/2000 | Ogawa |
| 6,335,724 | B1 | 1/2002 | Takekawa et al. |
| 6,421,042 | B1 | 7/2002 | Omura et al. |
| 6,429,856 | B1 | 8/2002 | Omura et al. |
| 6,480,187 | B1 | 11/2002 | Sano et al. |

FOREIGN PATENT DOCUMENTS

| JP | 5-053717 | 3/1993 |
| JP | 2678231 | 8/1997 |
| JP | 11-085376 | 3/1999 |

*Primary Examiner*—Henry N. Tran
(74) *Attorney, Agent, or Firm*—Oblon, Spivak, McClelland, Maier & Neustadt, P.C.

(57) ABSTRACT

A coordinate input and detection device includes a touch panel, light emitting units, a reflective member, intensity distribution detection units, a coordinate detection unit, and filters. Each of light beams projected from the light emitting units travels and has a sector shape in a direction parallel to a surface of the touch panel. The light beams are reflected by the reflective member and received by the intensity distribution detection units. A coordinate detection unit detects a coordinate value of a position where the light beams are interrupted based on intensity distributions detected by the intensity distribution detection units. The filters are disposed in optical paths in directions perpendicular to directions in which the light beams travel, and have transmission rates varying with respect to positions within the filters.

3 Claims, 14 Drawing Sheets

COORDINATE INPUT AND DETECTION DEVICE AND INFORMATION DISPLAY AND INPUT APPARATUS

This application is a divisional application of parent U.S. application Ser. No. 09/813,991, filed on Mar. 22, 2001 now U.S. Pat. No. 6,654,007, which claims priority to JP 2000-096991, filed on Mar. 31, 2000, the contents of both which are incorporated by reference.

BACKGROUND OF THE INVENTION

1. Field of the Invention

The present invention generally relates to coordinate input and detection devices and information display and input apparatuses, and more particularly to a coordinate input and detection device employed in, for instance, an optical coordinate input device, an optical coordinate detection device, or an optical touch panel and to an information display and input apparatus including such a coordinate input and detection device and an information display unit having a display, such as a large screen display unit with a touch panel, an electronic blackboard, a video conference apparatus, a large scale projection touch panel apparatus, a display-integrated tablet, or a multimedia board.

2. Description of the Related Art

Generally, in conferences or at the presentations of studies, a blackboard or a whiteboard is often employed as an information transfer medium that enables a large number of people to see the content of a study or proceedings at the same time. Recently, there has been an increased demand for an electronic blackboard, which can store and print out on papers what is written thereon.

Further, there has been developed an information display and input system that inputs a position or information to a computer in real time, which position or information is indicated or written on a touch panel on a display by a finger of an operator or a touch pen, and displays a variety of information corresponding to the indicated position or written information.

In such a system, it is necessary to detect with high accuracy an indicated position, or a touched position, on the surface of the touch panel when the inputs are made from the touch panel.

For instance, Japanese Patent No. 2678231 discloses, as a coordinate input and detection device detecting an indicated position on the surface of a touch panel, a device that has numerous optical emitters and detectors arranged in positions opposing each other on the periphery of the touch panel surface of a display screen to form a light beam matrix all over the touch panel surface so that a position where light beams are interrupted (hereinafter referred to as a light beam interruption position) by a contact of a finger or a pen with the touch panel can be detected.

Since the above-mentioned device has an advantage of achieving a high signal to noise ratio (S/N), the application of the device is extendable to a large-scale display unit. However, since the resolution of detection is proportional to a distance between each two adjacently arranged optical emitters or detectors, the device requires a large number of optical emitters and detectors to be arranged with narrow pitches so as to detect an input coordinate value with high accuracy. Therefore, the signal processing circuit of the optical emitters and detectors becomes complicated, thus increasing costs.

Japanese Laid-Open Patent Application No. 5-53717 discloses an optical two-dimensional coordinate input device that projects a light beam such as a laser beam from each of two points outside a touch panel to scan a region defined by projection angles of each light beam. According to the device, the angles of a position of a pen used exclusively for the device for retroreflecting the projected light beams are obtained from the lights reflected from the pen so as to calculate the coordinate position of the pen by applying the obtained angles to the principle of triangulation.

This coordinate input device, however, requires the pen used exclusively therefor, thus having an operational problem that an input to the device cannot be made by means of a finger or any pen other than the pen used exclusively for the device.

Japanese Laid-Open Patent Application No. 11-85376 discloses a device that has a pair of light emitting and receiving units each including a light emitting element, a light receiving element, and a polygon mirror disposed outside both corners of one side of a display panel. According to the device, the polygon mirrors are turned to scan almost all the surface of the display panel by means of two light beams. The light beams are reflected by retroreflective sheets provided on the longitudinal sides of the display panel to be detected by the light receiving elements of the above-described pair of the light emitting and receiving units so that a coordinate position is calculated by employing the principle of triangulation.

This device allows an input by means of a finger or a pen, provides a good visual recognizability, and is relatively easily enlarged in size. However, the device includes mechanical rotating parts, thus generating noises and vibrations. Therefore, the device has a difficulty in increasing detection accuracy in addition to problems of failure and durability.

The inventor of the present invention has already proposed a coordinate input and detection device that includes at least a couple of emitting means each projecting a light beam that is a parallel beam of an approximately uniform thickness in a direction perpendicular to a touch panel and has a sector shape in a direction parallel to the touch panel. According to the device, the light beams travel over a given region of the touch panel almost parallel to the surface thereof to be reflected by retroreflective sheets provided on the peripheral portion of the touch panel. The reflected lights are detected by at least a couple of intensity distribution detection means, which are optical-electrical transducers such as charge coupled devices (CCDs), so that the intensity distribution of each light is detected. The coordinate value of a position where the lights beams traveling over the given region of the touch panel are interrupted is detected by the intensity distributions of the light beams.

According to the above-described device, by interrupting a part of each light beam projected all over the given region of the touch panel by indicating a position on the surface of the touch panel by means of any indicator such as a finger or a pen, the coordinate value of the light beam interruption position is detected with high accuracy so that a desired input operation is performed. Therefore, the device dispenses with a special pen including a reflective material. Further, since the device does not employ a mechanical scanning mechanism such as a polygon mirror, the device is free of noises and vibrations to achieve good detection accuracy with fewer failures and good durability, thus eliminating all of the conventional disadvantages.

However, in order to detect the light beam interruption position with good accuracy from the intensity distributions of the light beams received by the intensity distribution detection means, each of the light beams received by the light receiving surfaces of the above-described intensity distribution detection means is required to have its amount of light approximately uniformly distributed in a direction parallel to the surface of the touch panel and perpendicular to a traveling direction of the reflected light of the light beam traveling over the given region of the touch panel.

However, the distribution of the amount of light in a direction perpendicular to the optical axis of a light-emitting diode (LED) or a laser diode (LD) employed as a light source of each light emitting means, which distribution correlates to the intensity distribution of light emission, has a non-uniform characteristic that as indicated by a curve 51 shown in FIG. 1, the amount of light is maximized around a light source 50 and decreases in proportion to a distance therefrom.

Therefore, in the case of forming, by a combination of cylindrical lenses, the light beam into the parallel beam of the approximately uniform thickness in the direction perpendicular to the touch panel and into the sector shape in the direction parallel to the touch panel, the distribution of the amount of light in the direction parallel to the surface of the touch panel particularly has a characteristic that the amount of light is maximized at the center portion of the light beam and decreases as a measurement point of the amount of light approaches each end portion of the light beam.

Therefore, a light modulation plate 60 is disposed on an optical path of the light beam projected from each light emitting means to be received by each intensity distribution detection unit 70 so that the amount of light is modulated to be uniformly distributed in the direction parallel to the surface of the touch panel.

That is, as shown in FIG. 1, a light beam 55 projected from each light emitting means (not shown) to be reflected back from the retroreflective sheet is made incident on a condenser lens (image formation lens) 71 of the intensity distribution detection unit 70 through an opening portion 60a of the light modulation plate 60. An image is formed, by the function of the condenser lens 71, on a light receiving element array 72b formed by light receiving elements arranged in a linear array on a light receiving surface 72a of a CCD 72 that is an optical-electrical transducer so that the intensity distribution of the light beam 55 is detected.

The light modulation plate 60 is stamped out from a sheet metal to have its outer shape and the opening portion 60a formed. The opening portion 60a is a slit longitudinally narrow in a spreading direction of the light beam 55 parallel to the surface of the touch panel (in a right-to-left direction or a Y-axial direction in FIG. 1), and has its width d gradually varying so as to be the widest at both end portions thereof and the narrowest at the center thereof.

Therefore, if a light beam having its amount of light distributed uniformly all over the opening portion 60a in a longitudinal direction thereof is made incident on the opening portion 60a, the amount of light of the light beam passing through the light modulation plate 60 is distributed to be minimized at the center portion of the light beam and maximized at both end portions thereof, as indicated by a curve 52 shown in FIG. 1.

However, as described above, the distribution of the amount of light of the actual light source 50 has the characteristic indicated by the curve 51 of FIG. 1. Therefore, by passing through the light modulation plate 60, the light beam can be modulated to have its amount of light distributed almost uniformly in the Y-axial direction as indicated by a broken curve 53 of FIG. 1.

The light beam 55 is made incident on the condenser lens 71 so as to be gathered at the center thereof in the Y-axial direction, and is laterally reversed to form the image on the light receiving element array 72b of the CCD 72 so that the intensity distribution of the light beam is detected. Accordingly, in this manner, an intensity distribution signal having an almost uniform level all over the light receiving element array 72b is usually detected.

Thus, by changing the shape of the opening portion 60a of the light modulation plate 60, the incident light beam can be modulated to have a desired distribution of its amount of light. Therefore, the distribution of the amount of light of the light beam 55 in the Y-axial direction can be adjusted to the characteristic of the CCD 72.

This requires a thickness D of the incident light beam 55 in a direction perpendicular to the surface of the touch panel to be thicker than a certain thickness, and the maximum value of the width d of the opening portion 60a of the light modulation plate 60 is determined based on the thickness D. If the maximum value of the width d is small, a variation in the width d is prevented from being great, thus narrowing a light modulation range. Therefore, the narrowed light modulation range, together with a limit to the dimensions of a metal mold for processing the sheet metal and a problem of processing accuracy, prevents a desired light modulation characteristic from being obtained.

However, in the above-described coordinate input and detection device, the thickness D of the sector-shaped light beam 55 projected over the surface of the touch panel is required to be as thin as possible to minimize a detectable region in the direction perpendicular to the surface of the touch panel so that a wrong detection based on an unnecessary interruption of the light beam other than an indication by means of a finger or an indication pen is prevented from being caused and that the detection accuracy of the coordinate value of a light beam interruption position is increased.

It is difficult to satisfy both of the above-described requirements. The above-described adjustment of the distribution of the amount of light of the light beam 55 incident on the light receiving surface 72a by means of the light modulation plate 60 is prevented from making sufficiently thin the thickness D of the light beam 55 in the direction perpendicular to the surface of the touch panel. Therefore, there remains the problem that a wrong detection based on an unnecessary interruption of the light beam other than an indication by means of a finger or an indication pen is caused or a sufficient detection accuracy of the coordinate value of a light beam interruption position is prevented from being obtained.

SUMMARY OF THE INVENTION

It is a general object of the present invention to provide a coordinate input and detection device and an information display and input apparatus in which the above-described disadvantages are eliminated.

A more specific object of the present invention is to provide a coordinate input and detection device which makes each of sector-shaped light beams projected over the surface of a touch panel as thin as possible in a direction perpendicular to the surface of the touch panel so that a wrong detection based on an unnecessary interruption of each light beam other than an indication by means of a finger or an indication pen is prevented from being caused and that the detection accuracy of the coordinate value of a light beam interruption position is increased, and adjusts each light beam made incident on each light receiving surface so that each light beam is distributed uniformly in a spreading direction thereof parallel to the surface of the touch panel also for the purpose of increasing the detection accuracy.

It is another more specific object of the present invention to provide an information display and input apparatus including such a coordinate input and detection device.

The above objects of the present invention are achieved by a coordinate input and detection device including: a touch panel including a surface; a plurality of light emitting units projecting light beams traveling parallel to the surface of the touch panel over a predetermined region of the touch panel, each of the light beams being a parallel beam having a uniform thickness in a direction perpendicular to the surface of the touch panel and having a sector shape in a direction parallel to the surface of the touch panel; a reflective member provided on a peripheral portion of the touch panel to reflect the light beams toward first optical paths through which the respective light beams travel to reach the reflective member; a plurality of intensity distribution detection units receiving the respective light beams reflected by the reflective member to detect intensity distributions of the light beams; a coordinate detection unit detecting a coordinate value of a position where the light beams are interrupted based on the intensity distributions; and a plurality of filters disposed in respective second optical paths in directions perpendicular to directions in which the respective lights beams travel, the second optical paths being optical paths through which the respective light beams reflected by the reflective member travel to reach the respective intensity distribution detection units, the filters having transmission rates varying with respect to positions within the filters.

According to the above-described coordinate input and detection device, the distribution of the amount of light of each light beam can be adjusted to have an optimum characteristic by varying the transmission rate of each filter along a longitudinal length thereof even though a thickness of each light beam passing through each filter is thin.

Therefore, a wrong detection based on an unnecessary interruption of each light beam other than an indication by means of a finger or an indication pen or based on non-uniformity of the distribution of amount of light is prevented from being caused, and an input position detection with higher accuracy and increased reliability can be performed.

The above objects of the present invention are also achieved by an information display and input apparatus including an information display unit including a display for displaying a variety of information, and a coordinate input and detection device, which device includes: a touch panel including a surface, the touch panel serving as the display of the information display unit; a plurality of light emitting units projecting light beams traveling parallel to the surface of the touch panel over a predetermined region of the touch panel, each of the light beams being a parallel beam having a uniform thickness in a direction perpendicular to the surface of the touch panel and having a sector shape in a direction parallel to the surface of the touch panel; a reflective member provided on a peripheral portion of the touch panel to reflect the light beams toward first optical paths through which the respective light beams travel to reach the reflective member; a plurality of intensity distribution detection units receiving the respective light beams reflected by the reflective member to detect intensity distributions of the light beams; a coordinate detection unit detecting a coordinate value of a position where the light beams are interrupted based on the intensity distributions; and a plurality of filters disposed in respective second optical paths in directions perpendicular to directions in which the respective lights beams travel, the second optical paths being optical paths through which the respective light beams reflected by the reflective member travel to reach the respective intensity distribution detection units, the filters having transmission rates varying with respect to positions within the filters.

The above objects of the present invention are further achieved by an information display and input apparatus including an information display unit including a display for displaying a variety of information, and a coordinate input and detection device, which device includes: a touch panel including a surface, the touch panel being made of a transparent material and placed on the display of the information display unit; a plurality of light emitting units projecting light beams traveling parallel to the surface of the touch panel over a predetermined region of the touch panel, each of the light beams being a parallel beam having a uniform thickness in a direction perpendicular to the surface of the touch panel and having a sector shape in a direction parallel to the surface of the touch panel; a reflective member provided on a peripheral portion of the touch panel to reflect the light beams toward first optical paths through which the respective light beams travel to reach the reflective member; a plurality of intensity distribution detection units receiving the respective light beams reflected by the reflective member to detect intensity distributions of the light beams; a coordinate detection unit detecting a coordinate value of a position where the light beams are interrupted based on the intensity distributions; and a plurality of filters disposed in respective second optical paths in directions perpendicular to directions in which the respective lights beams travel, the second optical paths being optical paths through which the respective light beams reflected by the reflective member travel to reach the respective intensity distribution detection units, the filters having transmission rates varying with respect to positions within the filters.

According to the above-described information display and input apparatuses, the same effects as those of the above-described coordinate input and detection device can be obtained.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of embodiments of the present invention.

Figure 2:
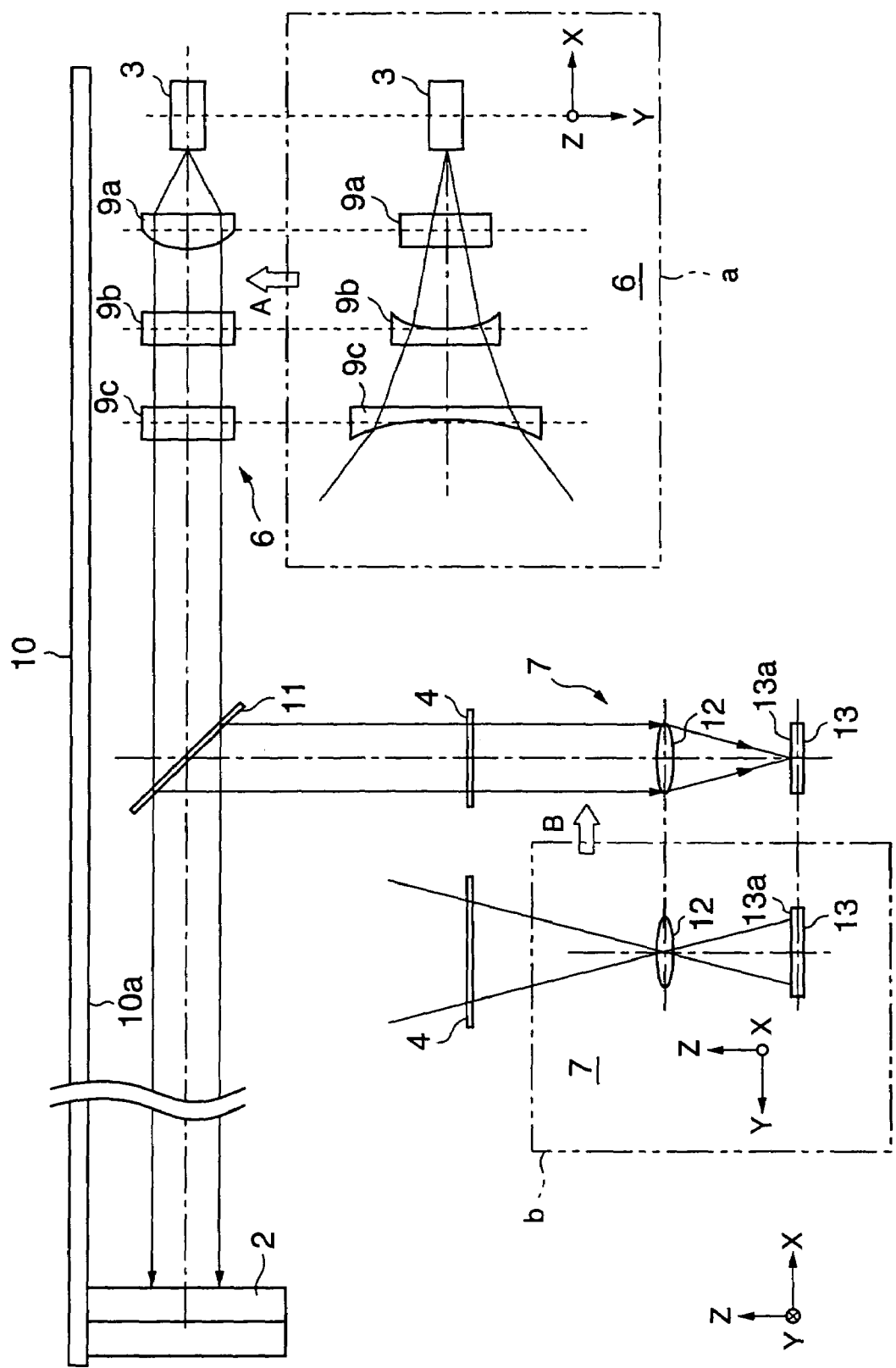
FIG. 2 is a diagram showing a structure of an optical unit of an embodiment of a coordinate input and detection device according to the present invention and optical paths of projected and reflected light beams in the optical unit.
Figure 3:
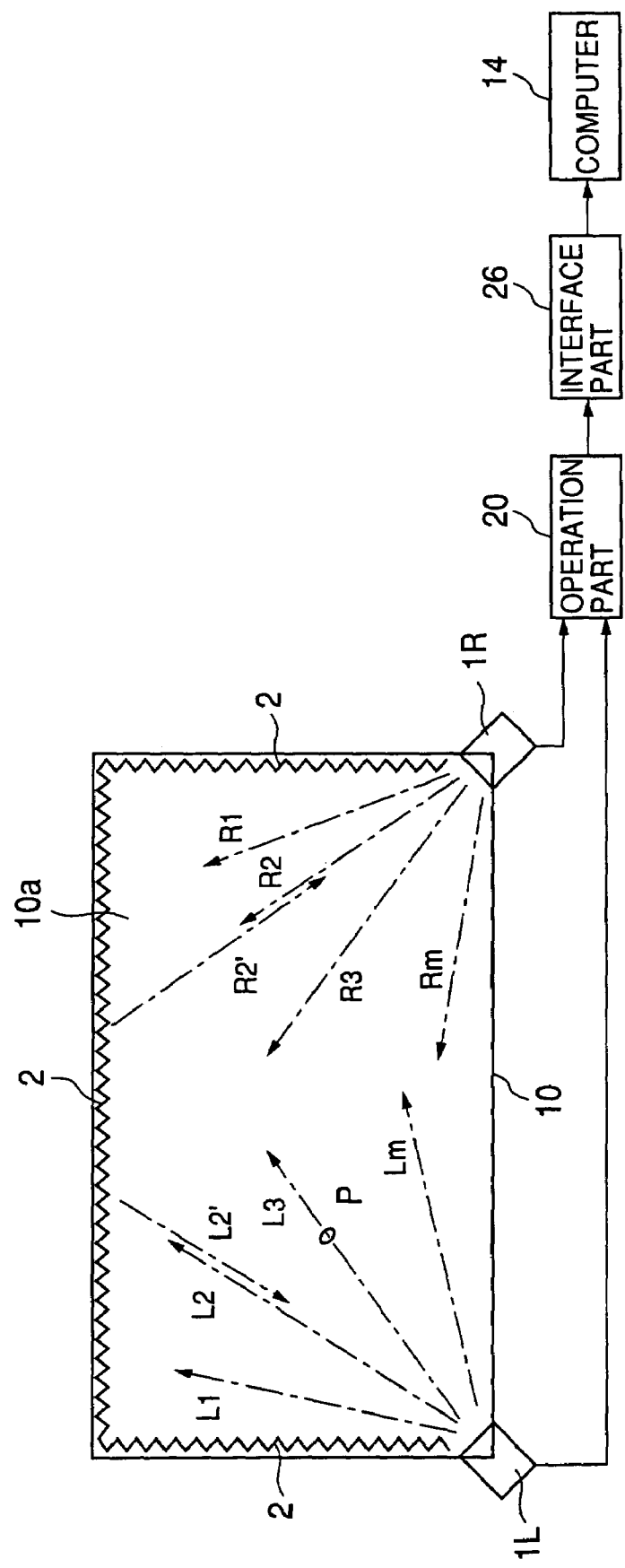
FIG. 3 is a schematic diagram of an overall structure of the coordinate input and detection device of FIG. 2.
Figure 4:
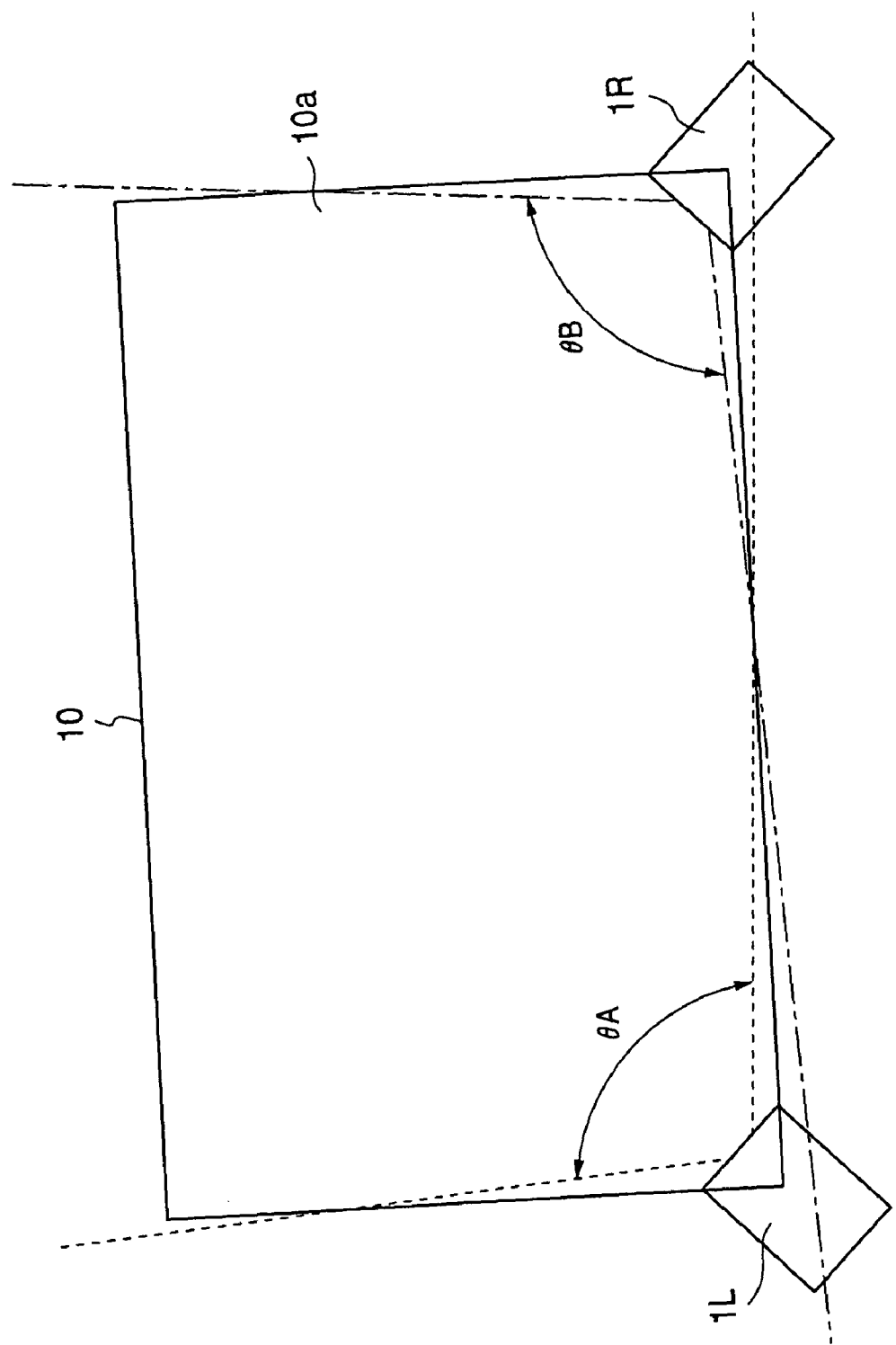
FIG. 4 is a diagram for illustrating a detection region on a touch panel covered by a pair of optical units shown in FIG. 3.

FIG. 2 is a diagram showing a structure of an optical unit of an embodiment of a coordinate input and detection device according to the present invention and optical paths of projected and reflected light beams in the optical unit. FIG. 3 is a schematic diagram of an overall structure of the coordinate input and detection device. FIG. 4 is a diagram for illustrating a detection region on a touch panel 10 covered by a pair of the optical units 1L and 1R.

According to FIG. 3, the coordinate input and detection device includes the touch panel 10 and a pair of the optical units 1L and 1R each provided slantwise on a corresponding corner portion of the bottom side of the touch panel 10. Each of the optical units 1L and 1R includes an optical system including a light source 3, a CCD 13, a half mirror 11, cylindrical lenses 9a through 9c, a condenser lens (image formation lens) 12, and a filter 4. The light source 3 and the cylindrical lenses 9a through 9c form a light emitting part 6, and the CCD 13 and the condenser lens 12 form a light receiving part 7.

A retroreflective sheet 2 that is a reflective member is provided on the three sides other than the bottom side of the touch panel 10. The retroreflective sheet 2, which is, for instance, an arrangement of numerous cylindrical corner cubes, has the characteristic of reflecting an incident light to the same optical path.

The retroreflective sheet 2 is provided on the three sides other than the bottom side of the touch panel 10 and the optical units 1L and 1R are provided on the left and right corners of the bottom side of the touch panel 10, respectively, because the reflection efficiency of the retroreflective sheet 2 may be deteriorated by dust prone to collect thereon if the retroreflective sheet 2 is disposed on the bottom side of the touch panel 10.

As shown in FIG. 4, light beams projected from the optical units 1L and 1R spread out in sector shapes covering regions within angles θA and θB, respectively, in a direction parallel to a panel surface 10a of the touch panel 10 so that a position can be detected in almost all the region of the panel surface 10a. As the angles θA and θB become greater, the sector-shaped light beams cover a greater region of the panel surface 10a, so that an extensive position detection is performable.

Each of the light beams projected from the optical units 1L and 1R is a parallel beam having a uniform thickness in a direction perpendicular to the panel surface 10a.

In FIG. 3, for convenience of description, the sector-shaped light beam projected from the optical unit 1L is formed of a bundle of lights L1 through Lm, and similarly, the sector-shaped light beam projected from the optical unit 1R is formed of a bundle of lights R1 through Rm.

The light beams projected from the optical units 1L and 1R travel parallel to the panel surface 10a of the touch panel 10 to reach the retroreflective sheet 2 provided on the three sides of the touch panel 10. Upon reaching the retroreflective sheet 2, the respective light beams are reflected back therefrom to the optical units 1L and 1R through the same optical paths as indicated by reflected lights L2' and R2' in FIG. 3.

However, if an interrupting object such as an indicator P exists on the panel surface 10a, projected lights hitting the interrupting object are interrupted thereby and do not reach the retroreflective sheet 2. Therefore, the projected lights are never reflected back from the retroreflective sheet 2 to the respective optical units 1L and 1R.

Directions from which the projected lights are not reflected back can be detected from detection signals generated by the light receiving parts 7 in the respective optical units 1L and 1R. Based on the detection signals generated by the light receiving parts 7 in the respective optical units 1L and 1R, an operation part 20 that is a coordinate detection unit performs an operation to detect the coordinate value of a position where the lights traveling over a given region of the touch panel 10 are interrupted by the indicator P. The details of this operation will be described later.

The coordinate data of the position detected by the operation part 20 is outputted to a computer 14 through an interface part 26.

Next, a detailed description will be given of the structures of the optical units 1L and 1R, and the optical paths of the projected light beams and the light beams reflected back from the retroreflective sheet 2.

Since the optical units 1L and 1R have the same structure, a description of the optical unit with reference to FIG. 2 applies to both optical units 1L and 1R.

In FIG. 2, coordinate axes of directions parallel to the panel surface 10a of the touch panel 10 are defined as an X-axis and a Y-axis, respectively, and a coordinate axis of a direction perpendicular to the panel surface 10a is defined as a Z-axis.

Each of the optical units 1L and 1R includes the light emitting part 6, which is a light emitting unit, the light receiving part 7, which is an intensity distribution detection unit, the half mirror 11, which is a light splitting member, and the filter 4, which is a unit for adjusting the distribution of amount of light.

FIG. 2 is basically a view from an X-Z plane. However, a part framed by a double dot chain line a, which is a diagram viewing the light emitting part 6 in a direction indicated by arrow A from an X-Y plane, and a part framed by a double dot chain line b, which is a diagram viewing the light receiving part 7 in a direction indicated by arrow B from an Y-Z plane, are also shown in FIG. 2 for convenience of graphical representation.

The light emitting part 6 includes the light source 3 whose spot can be narrowed to some extent, such as an LD or an LED. The light beam projected from the light source 3 is collimated by the cylindrical lens 9a, which functions as a convex lens only in a Z-axial direction, to be a thin parallel beam having a uniform thickness in the direction perpendicular to the panel surface 10a (in the Z-axial direction). Then, the light beam is diffused in the sector shape in the direction parallel to the panel surface 10a (in the Y-axial direction) by the two cylindrical lenses 9b and 9c each functioning as a concave lens only in the Y-axial direction.

Thus, the light beam that is the thin parallel beam having the uniform thickness in the direction perpendicular to the panel surface 10a and is diffused, in the direction parallel to the panel surface 10a, in the sector shape having a predetermined angle from the position where the light emitting part 6 is disposed is projected almost parallel to the panel surface 10 from the light emitting part 6. The projected light beam passes through the half mirror 11 to be radiated almost all over the detection region of the panel surface 10a.

If not interrupted on the way, the light beam reaches the retroreflective sheet 2 provided on the periphery of the touch panel 10 to be retroreflected therefrom. The reflected light beam returns to the same optical unit through the same optical path, and is reflected by 90° from the half mirror 11 to be made incident on the light receiving part 7 through the filter 4.

The filter 4 is disposed in a direction perpendicular to a traveling direction of the reflected light beam. The transmission rate of the filter 4 differs along its length in the direction in which the filter 4 is disposed, especially, in the direction in which the light beam spreads out (in the Y-axial direction) shown in the part framed by the double dot chain line b in FIG. 2, so that the amount of light is adjusted to be distributed uniformly in that direction. A detailed description of the filter 4 will be given later.

The light receiving part 7 includes the condenser lens (image formation lens) 12 that is a convex lens and the CCD 13 that is an optical-electrical transducer. The reflected light beam is propagated in the direction lateral to the panel surface 10a to concentrate at the center of the condenser lens 12, and in the direction perpendicular to the panel surface 10a to be made incident on the condenser lens 12 in the same form of the parallel beam. Therefore, due to the function of the condenser lens 12, the reflected light beam is formed on a light receiving surface 13a of the CCD 13 disposed on the focal surface of the condenser lens 12 into the image of a thin line parallel to the Y-axial direction, which line corresponds to a linear array arrangement of light receiving elements.

Thereby, the intensity distribution of the light beam parallel to the Y-axial direction is formed on the light receiving surface 13a of the CCD 13 depending on the presence or absence of retroreflected lights, and is detected by the CCD 13 to be converted into an electrical signal. That is, if the retroreflected light beam is interrupted by a finger or a pen, a point of weak optical intensity, which is a later-described peak point, is generated in a position corresponding to an interrupted retroreflected light on the light receiving surface 13a, and appears in the waveform of the detection signal.

Figure 5:
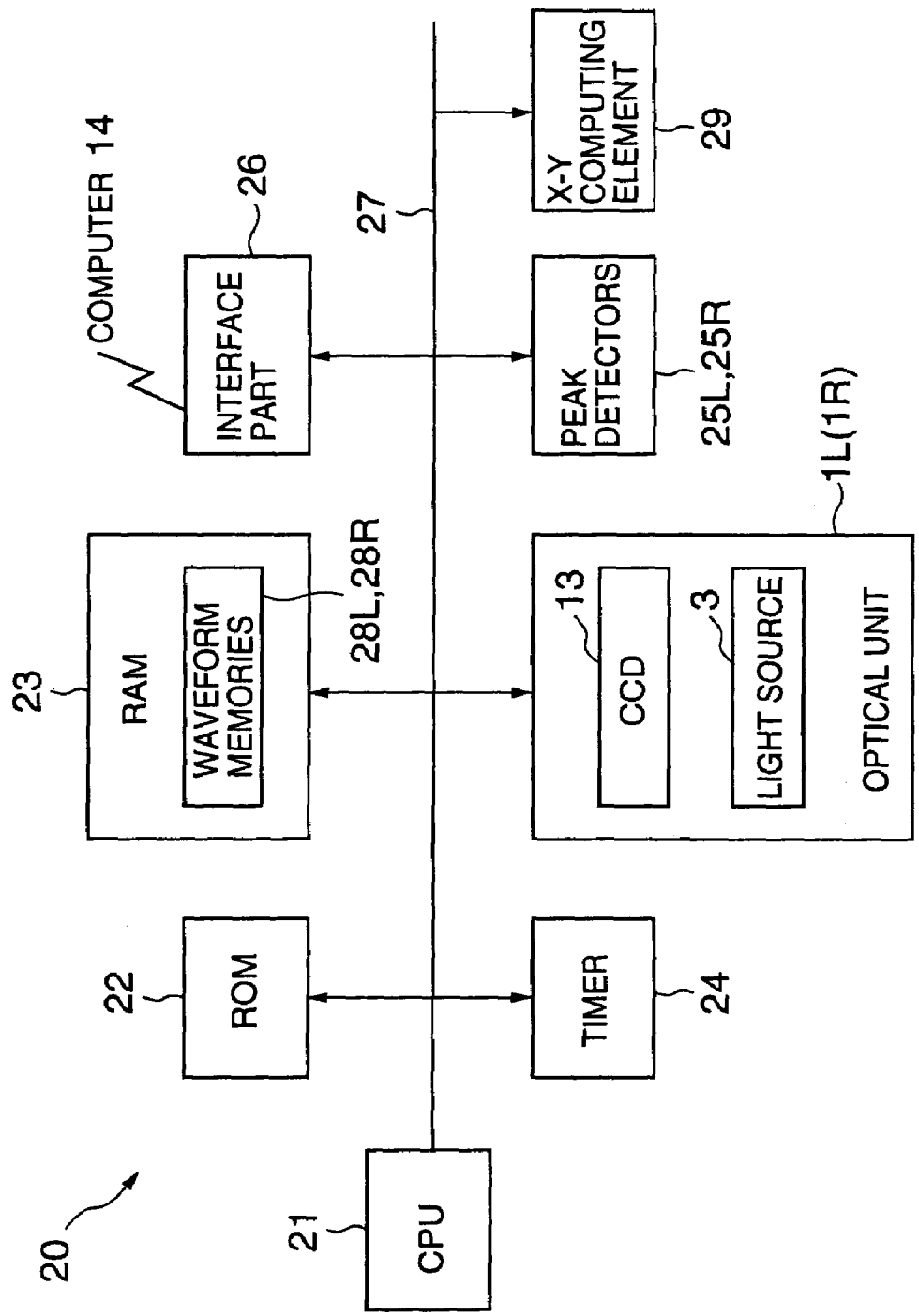
FIG. 5 is a block diagram showing a structure of an operation part together with the optical units shown in FIG. 3.

Next, a description will be given of the operation part 20 shown in FIG. 3. FIG. 5 is a block diagram showing a structure of the operation part 20 together with the optical units 1L and 1R.

The operation part 20 includes a CPU 21 supervising and controlling the whole part, a ROM 22 storing fixed data such as control programs of the CPU 21, a RAM 23 storing temporary data, a timer 24 controlling the time intervals of light emission from the light source 3 provided in each of the optical units 1L and 1R, peak detectors 25L and 25R, an x-y computing element 29, and a bus 27 connecting the above-described parts. The RAM 23 includes the regions of waveform memories 28L and 28R. The operation part 20 is connected to the computer 14 via the interface part 26.

The operation part 20 performs the operation to detect the coordinate value of a position where the light beam traveling over the panel surface 10a is interrupted based on an electrical signal inputted from each of the CCDs 13 of the optical units 1L and 1R, which signal corresponds to the intensity distribution of the retroreflective light beam in the direction parallel to the panel surface 10a.

Figure 6:
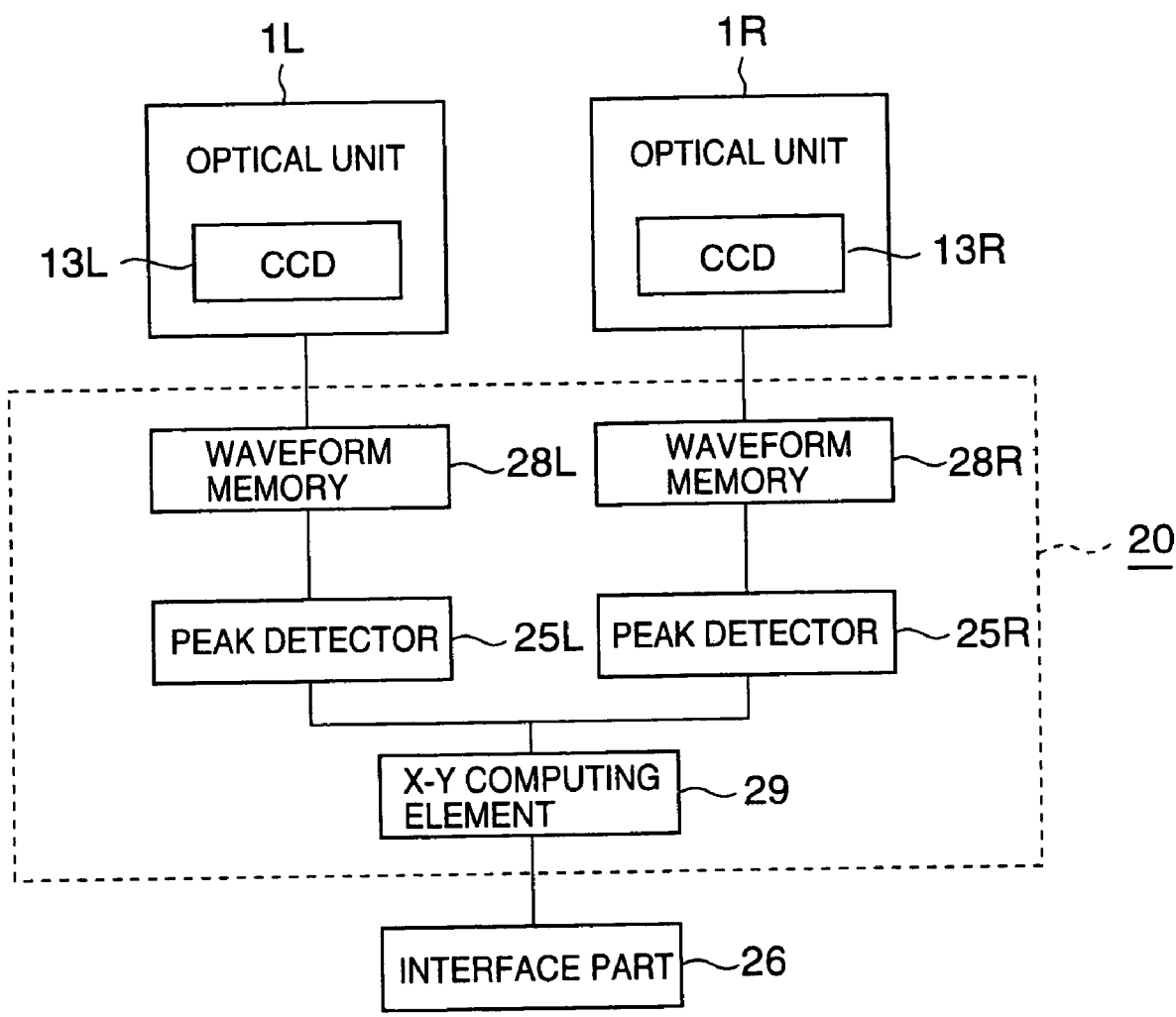
FIG. 6 is a block diagram showing only a portion of the operation part shown in FIG. 5, which portion is used so that a CPU performs a coordinate detection operation.

A description will be given, with reference to FIGS. 6 through 8, of the above-mentioned operation. FIG. 6 is a block diagram showing only a portion of the operation part 20, which portion is used so that the CPU 21 performs the coordinate detection operation.

First and second waveform data representing the intensity distributions of the light beams in the direction parallel to the panel surface 10a, which intensity distributions are outputted as electrical signals from the respective CCDs 13 of the optical units 1L and 1R shown in FIG. 3, are inputted to the operation part 20. Hereinafter, the CCDs 13 of the optical units 1L and 1R are referred to as a CCD 13L and a CCD 13R, respectively. The first and second waveform data are then stored in the waveform memories 28L and 28R in the RAM 23 shown in FIG. 5, respectively. The peak detectors 25L and 25R perform operations to detect the positions of the peak points of the first and second waveform data stored in the waveform memories 25L and 25R, respectively.

Figure 7:
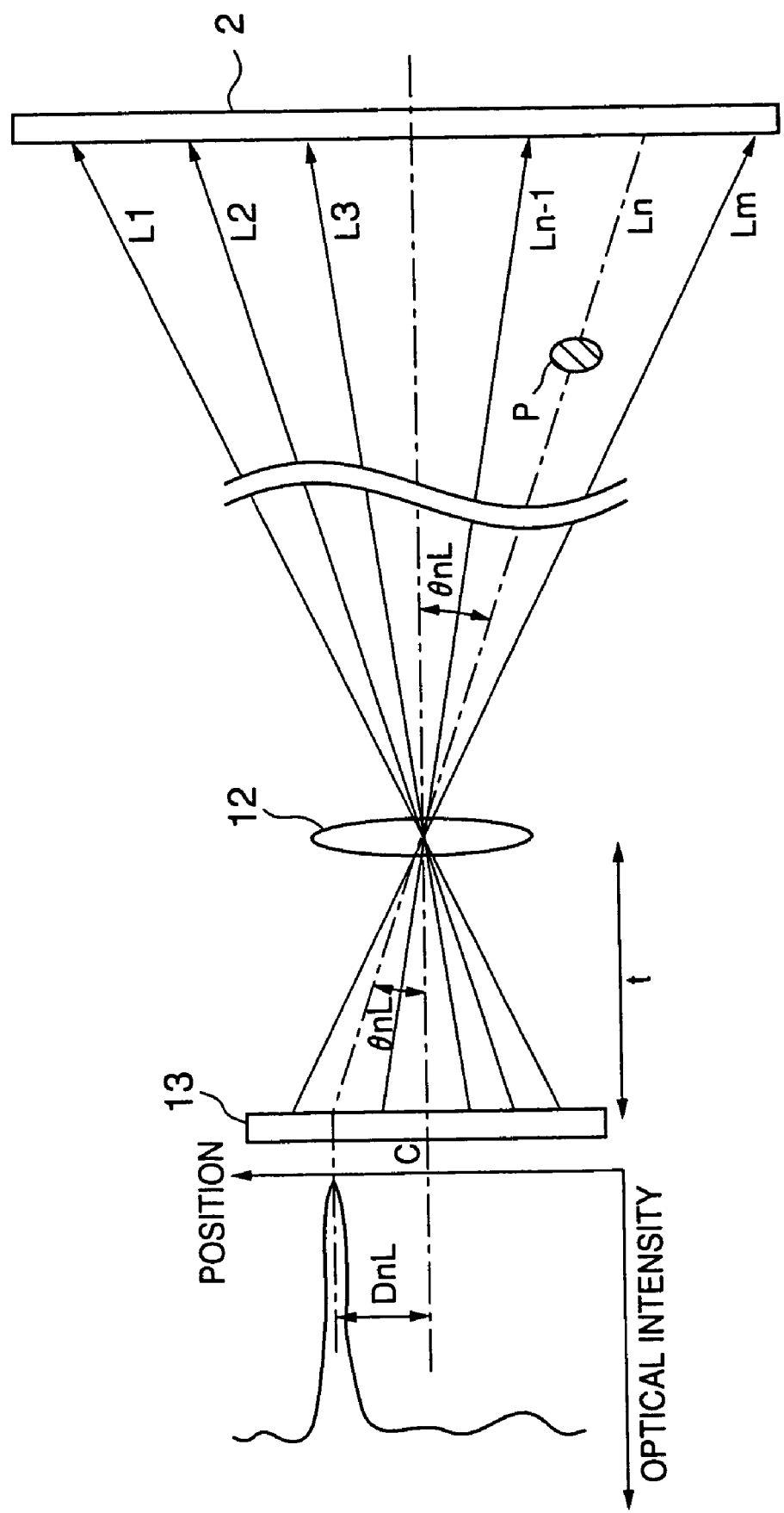
FIG. 7 is a diagram for illustrating a peak point detected by a peak detector shown in FIG. 6.

FIG. 7 is a diagram for illustrating a peak point. For instance, if the sector-shaped light beam formed of the lights L1, L2, L3, . . . , Ln-1, Ln, . . . , and Lm projected from the optical unit 1L has the nth light Ln interrupted by the indicator P such as a finger or a pen, the nth light Ln never reaches the retroreflective sheet 2. Therefore, since the nth light Ln is never detected by the CCD 13L of the optical unit 1L, a point of weak optical intensity (dark point) is generated in a position in the optical detector array of the CCD 13L at a distance DnL from a center C thereof. Hereinafter, this position is referred to as a position DnL. As a result, a peak point of a lowered level appears in the waveform of the intensity distribution of the light beam outputted from the CCD 13L. Similarly, with respect to the optical unit 1R, a dark point is generated in a position DnR in the optical detector array of the CCD 13R, and consequently, a peak point of a lowered level appears in the waveform of the intensity distribution of the light beam outputted from the CCD 13R.

The peak detectors 25L and 25R detect the positions DnL and DnR of the dark points that are the peak points of the waveforms, respectively, by means of, for instance, a waveform calculation method such as smoothing differential.

When the positions of the peak points are detected from the first and second waveform data by the peak detectors 25L and 25R, respectively, the x-y computing element 29 computes the coordinate value (x, y) of the position of the indicator P that causes the peak points to appear in the first and second waveform data.

A description will be given, with reference to FIG. 8, of an operation of the x-y computing element 29 for computing the coordinate value (x, y) of the position of the indicator P.

An angle of projection or incidence θnL of the light Ln of the optical unit 1L interrupted by the indicator P shown in FIG. 7, together with an angle of projection or incidence θnR of the light Rn of the optical unit 1R, can be computed from the following formulas.

$$\theta nL = \arctan(DnL/f) \quad (1)$$

$$\theta nR = \arctan(DnR/f) \quad (2)$$

In the above-mentioned formulas, DnL is the position of the dark point on the CCD 13L of the optical unit 1L detected by the peak detector 25L, DnR is the position of the dark point on the CCD 13R of the optical unit 1R detected by the peak detector 25R, and f is a distance between the condenser lens 12 and the light receiving elements of each of the CCDs 13L and 13R, which distance corresponds to the focal length of the condenser lens 12.

Figure 8:
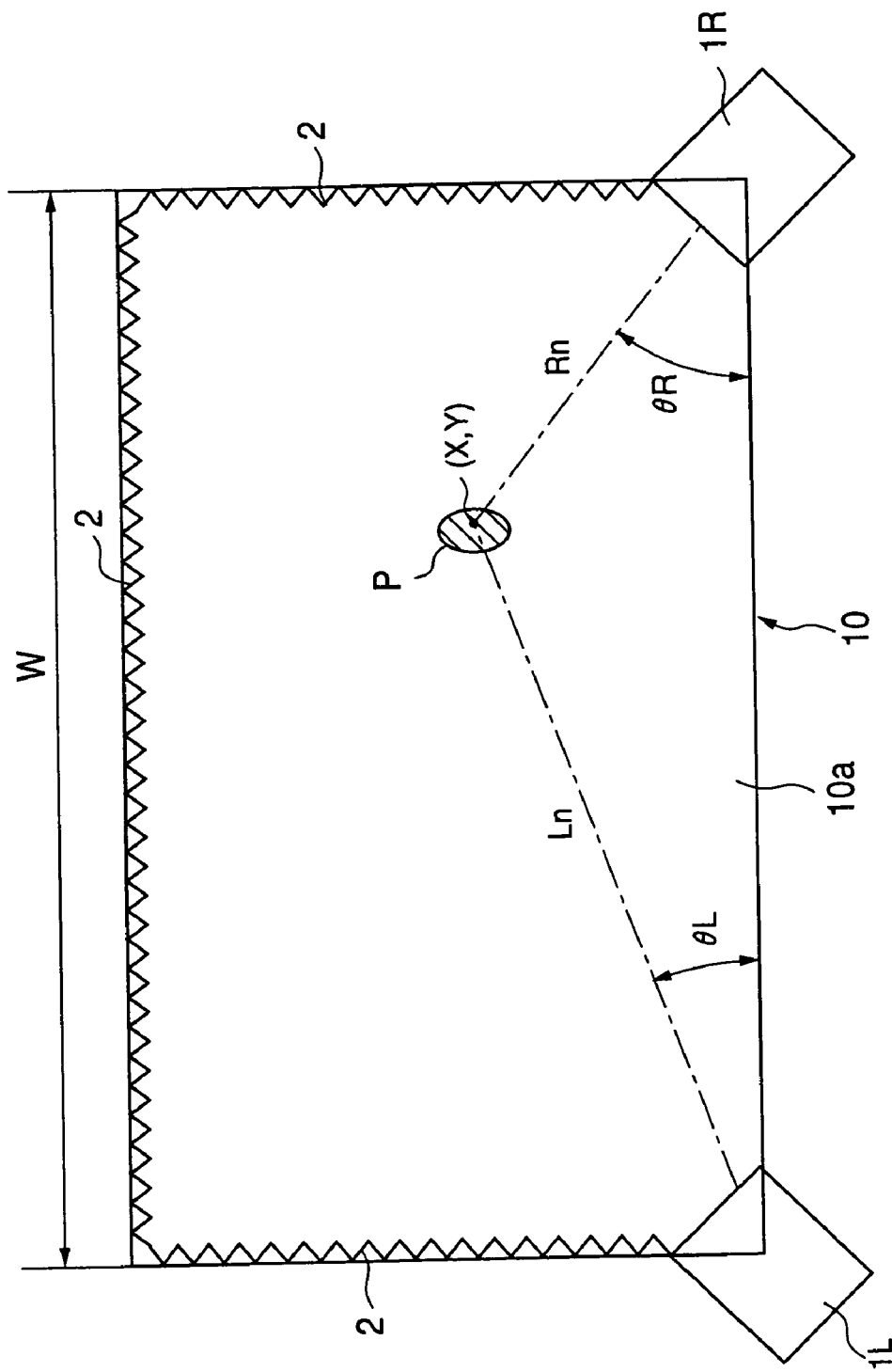
FIG. 8 is a diagram for illustrating an operation performed by an x-y computing element shown in FIG. 6 for computing a coordinate value of a position where light beams are interrupted.

By employing θnL obtained from the formula (1) and θnR obtained from the formula (2), an angle θL formed between the light Ln of the optical unit 1L shown in FIG. 8 and the bottom side (X-axial) of the touch panel 10, and an angle θR formed between the light Rn of the optical unit 1R and the bottom side (X-axial) of the touch panel 10 can be computed from the following formulas.

$$\theta L = g(\theta nL) \quad (3)$$

$$\theta R = h(\theta nR) \quad (4)$$

In the above-mentioned formulas, g is a deformation coefficient of the geometric relative positional relation between the touch panel 10 and the optical unit 1L, and h is a deformation coefficient of the geometric relative positional relation between the touch panel 10 and the optical unit 1R.

The coordinate value (x, y) of the position where the lights beams are interrupted by the indicator P is computed from the following formulas under the principle of triangulation.

$$x = w \tan \theta R / (\tan \theta L + \tan \theta R) \quad (5)$$

$$y = w \tan \theta L \tan \theta R / (\tan \theta L + \tan \theta R) \quad (6)$$

In the above-mentioned formulas, w is a distance between the optical units 1L and 1R.

Thus, the coordinate value (x, y) of the position where the lights Ln and Rn are interrupted by the indicator P is computed from the calculations of the formulas (1) through (6) by detecting the positions DnL and DnR. Programs required for the above-described calculations can be pre-stored in the ROM 22 as parts of the operation program of the CPU 21.

Here, a description will be given collectively of an overall operation of the coordinate input and detection device having the above-described structure.

As shown in FIG. 8, if a point on the panel surface 10a of the touch panel 10 of the coordinate input and detection device is indicated by the indicator P such as a finger or a pen, the lights Ln and Rn projected respectively from the optical units 1L and 1R are interrupted by the indicator P so as to be prevented from reaching the retroreflective sheet 2. Therefore, the lights Ln and Rn are never detected by the CCDs 13L and 13R of the optical units 1L and 1R, respectively.

Thereby, the points of weak optical intensity (dark points) are generated in the positions DnL and DnR on the respective CCDs 13L and 13R, and the first and second waveform data corresponding to the intensity distributions of the reflected lights in the direction parallel to the panel surface 10a are stored in the waveform memories 28L and 28R, respectively. Based on the first and second waveform data, the peak detectors 25L and 25R detect the positions DnL and DnR of the dark points on the respective CCDs 13L and 13R, and the x-y computing element 29 computes the coordinate value (x, y) of the position where the lights Ln and Rn are interrupted. Data of thus obtained coordinate value (x, y) is inputted to the computer 14 via the interface part 26, and an operation corresponding to the indicated position is performed.

Next, a description will be given of the filter 4 provided in the optical unit shown in FIG. 2, which filter is the most important element of the present invention.

Figure 1:
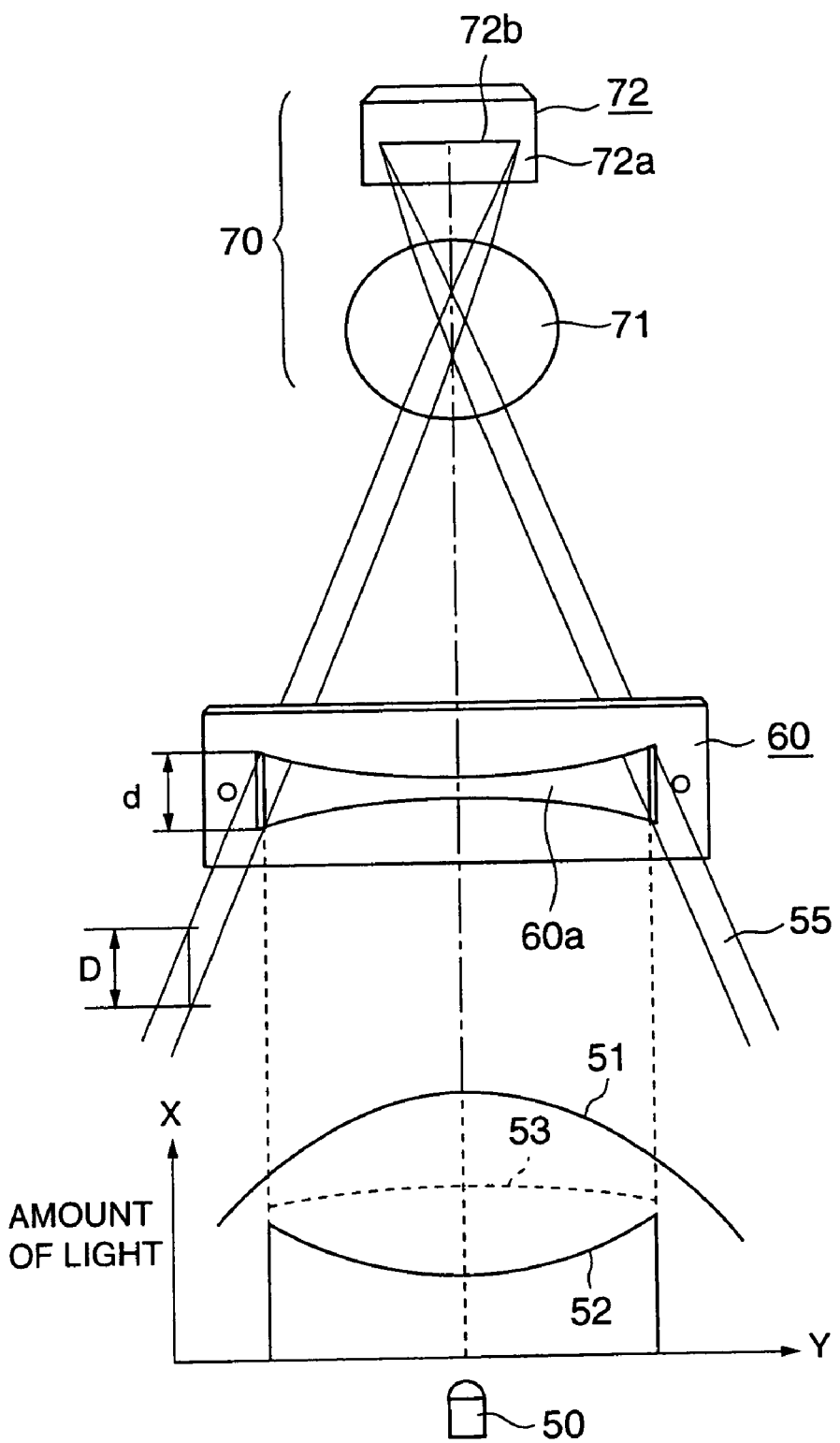
FIG. 1 is a diagram for illustrating a means for adjusting a distribution of amount of light of a received light beam in an optical unit of a conventional information display and input apparatus.

In the above-described coordinate input and detection device according to the present invention, in order to increase the detection accuracy of the coordinate value of an input position, it is required, at least, to make as thin as possible the thickness of each of the sector-shaped light beams projected parallel to the panel surface 10a of the touch panel 10 from the optical units 1L and 1R, respectively, and to have the amount of light of each light beam distributed uniformly in the direction in which the light beam spreads out in the sector shape. However, as previously described, since the amount of light of the light beam projected from the light source 3 shown in FIG. 1 is large in the center portion of the light beam spreading in the sector shape and decreases as the measurement point of the amount of light approaches each side of the light beam. Therefore, the filter 4 is employed to correct the distribution of the amount of light of the light beam.

Figure 9:
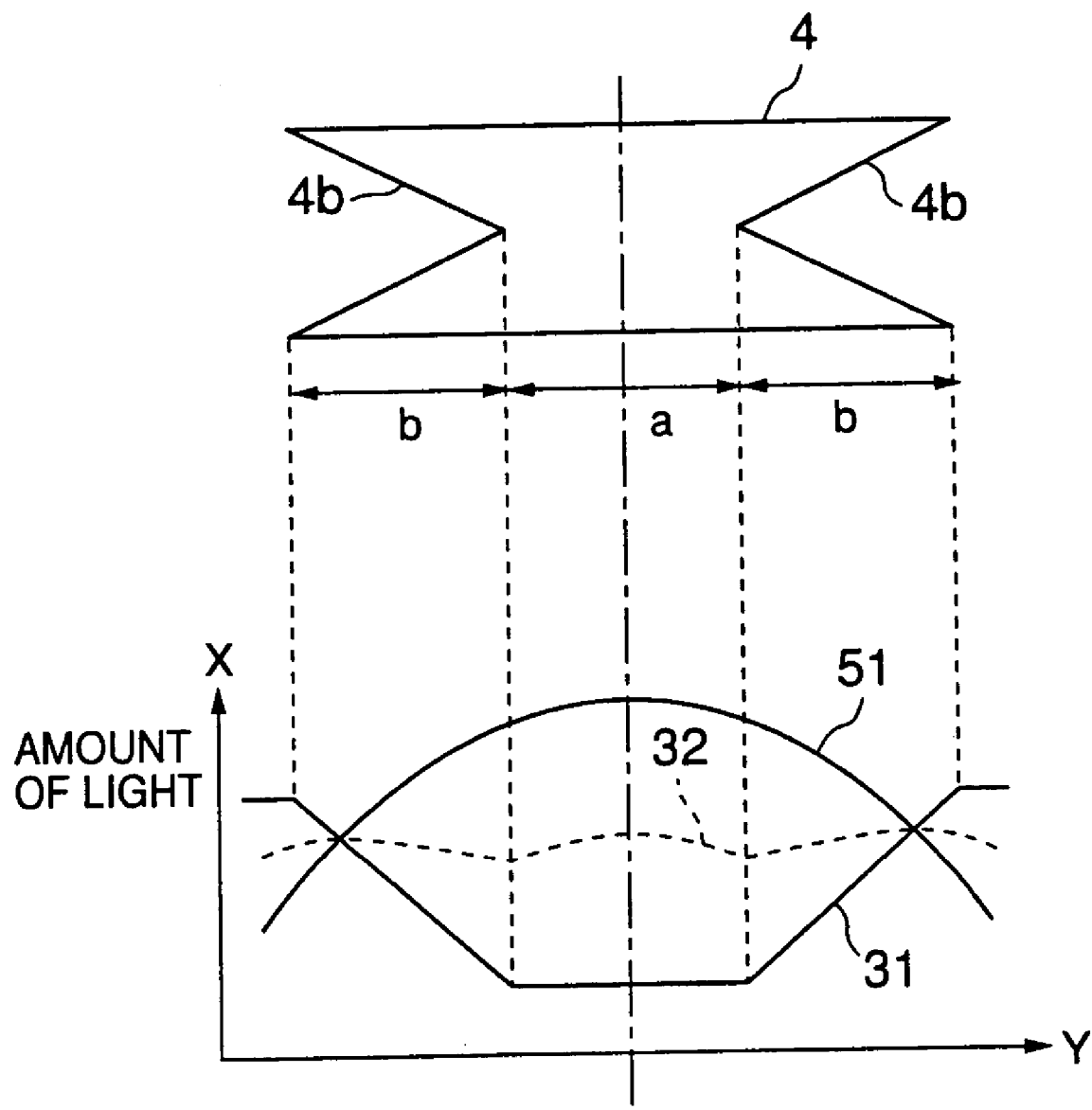
FIG. 9 is a diagram showing a structure and a characteristic of a first embodiment of a filter employed as a means for adjusting a distribution of amount of light in the coordinate input and detection device according to the present invention.

FIG. 9 is a diagram showing a shape and a characteristic of a first embodiment of the filter 4.

The filter 4 is formed of a single long thin resin film whose optical transmission rate is 25%, and, as shown in FIG. 2, is disposed, in the optical path of the light beam made incident on the light receiving part 7, in the direction perpendicular to the traveling direction of the light beam so that the light beam spread out in a longitudinal direction of the filter 4. The filter 4 has wedge-like notches 4b protruding from the respective longitudinal end portions toward the center portion thereof.

Therefore, although a portion a of the filter 4 without any notches 4b has a transmission rate of 25%, the transmission rate of each portion b including the notch 4b increases as a measurement point of the transmission rate approaches each longitudinal end portion of the filter 4 so as to reach almost 100% at each side thereof.

Thus, if a light beam is made incident on the filter 4 so that its amount of light is distributed uniformly all over the filter 4, the light beam passing through the filter 4 has its amount of light distributed in the Y-axial direction with a characteristic indicated by a curve 31 in FIG. 9.

However, an actual light beam made incident on the filter 4 does not have its amount of light distributed uniformly in the Y-axial direction, and therefore, the distribution of the amount of light has a characteristic indicated by the curve 51 in FIG. 9 as in the conventional example described with reference to FIG. 1. Therefore, if the light beam having such a distribution of the amount of light passes through the filter 4 of this embodiment, due to the transmission rate distribution of the filter 4, the distribution of the amount of light is averaged as indicated by a broken curve 32 in FIG. 9 to be almost uniform in the Y-axial direction.

Next, a description will be given, with reference to FIGS. 10A through 13, of a second embodiment of the filter 4.

Figure 10A:
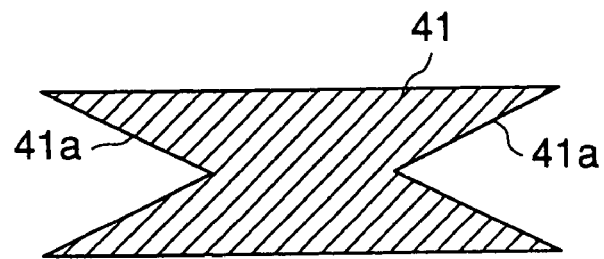
FIGS. 10A through 10C are diagrams showing a structure of a second embodiment of the filter according to the present invention.
Figure 10B:
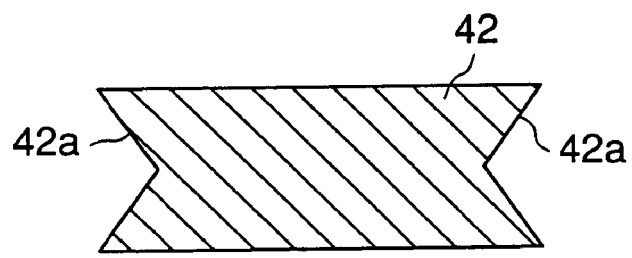
Figure 10C:
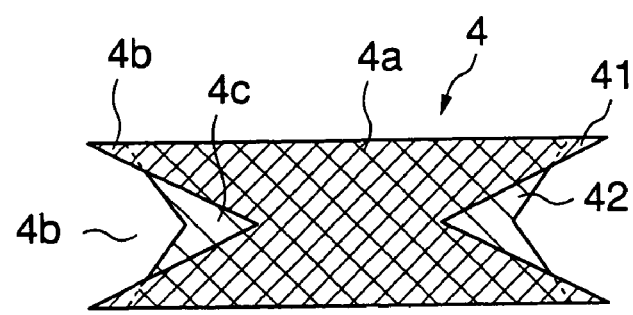

In this embodiment, as shown in FIGS. 10A and 10B, first and second filters 41 and 42 having different shapes and optical transmission rates are superposed on each other to form the filter 4 shown in FIG. 10C.

The first filter 41 of FIG. 10A has an optical transmission rate of 25%, and includes deep wedge-like notches 41a protruding from the respective longitudinal end portions toward the center portion thereof. On the other hand, the second filter 42 of FIG. 10B has an optical transmission rate of 50%, and includes shallow wedge-like notches 42a protruding from the respective longitudinal end portions toward the center portion thereof.

FIG. 10C shows a state in which the filter 4 is formed by superposing the first and second filters 41 and 42.

Therefore, the transmission rate of a portion 4a of the filter 4 where the first and second filters 41 and 42 are superposed is 12.5% (25%×50%=12.5%), the transmission rate of each portion 4b formed only of the first filter 41 is 25%, the transmission rate of each portion 4c formed only of the second filter 42 is 50%, and the transmission rate of each portion 4d formed only of the notches is 100%.

Figure 11:
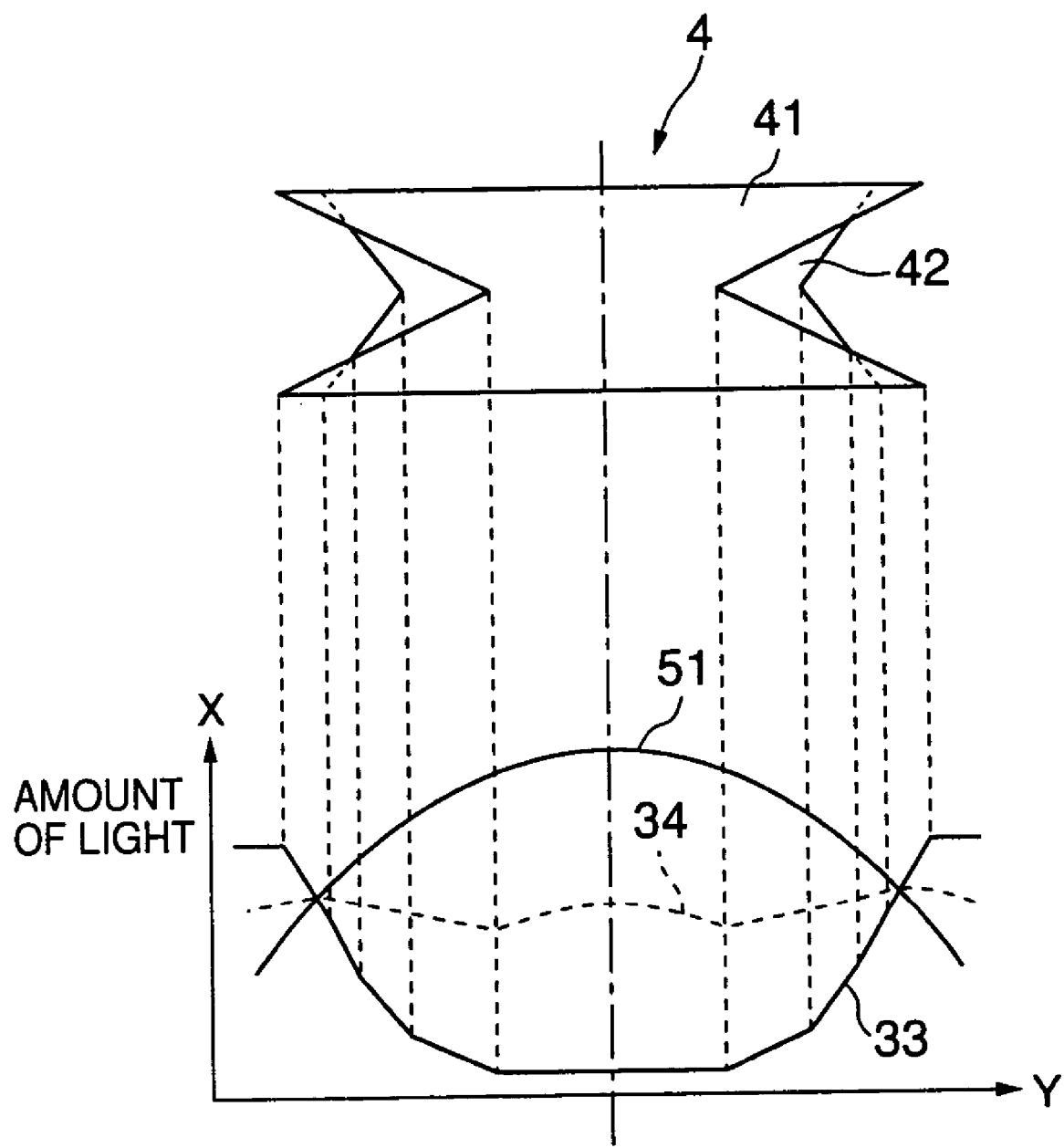
FIG. 11 is a diagram for illustrating a characteristic of the filter shown in FIGS. 10A through 10C.

Thus, if a light beam is made incident on the filter 4 so that its amount of light is distributed uniformly all over the filter 4, the light beam passing through the filter 4 has its amount of light distributed in the Y-axial direction with a characteristic indicated by a curve 33 in FIG. 11.

However, an actual light beam made incident on the filter 4 does not have its amount of light distributed uniformly in the Y-axial direction, and therefore, the distribution of the amount of light has the characteristic indicated by the curve 51 in FIG. 11 as in the conventional example described with reference to FIG. 1. Therefore, if the light beam having such a distribution of the amount of light passes through the filter 4 of this embodiment, due to the transmission rate distribution of the filter 4, the distribution of the amount of light is averaged as indicated by a broken curve 34 in FIG. 11 to be almost uniform in the Y-axial direction.

Thus, by a combination of a plurality of filters having different optical transmission rates and notch shapes, a filter having a desired transmission rate distribution can be made with more ease.

Figure 12A:
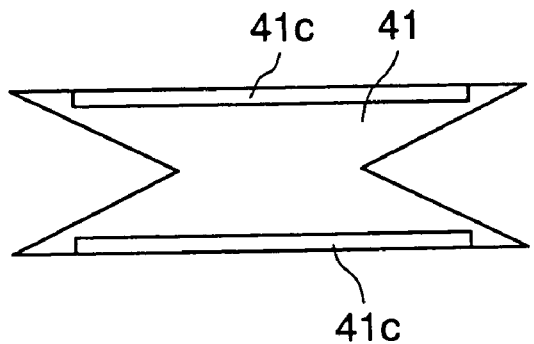
FIGS. 12A and 12B are diagrams for illustrating a state where adhesion portions are provided on first and second filters forming the filter shown in FIGS. 10A through 10C.
Figure 12B:
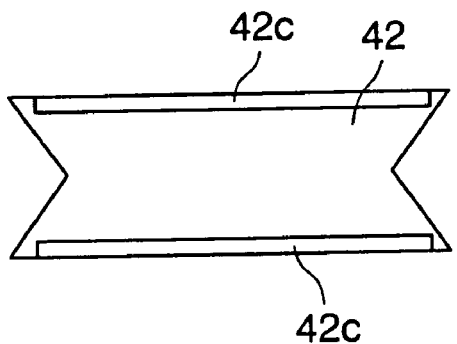
Figure 13:
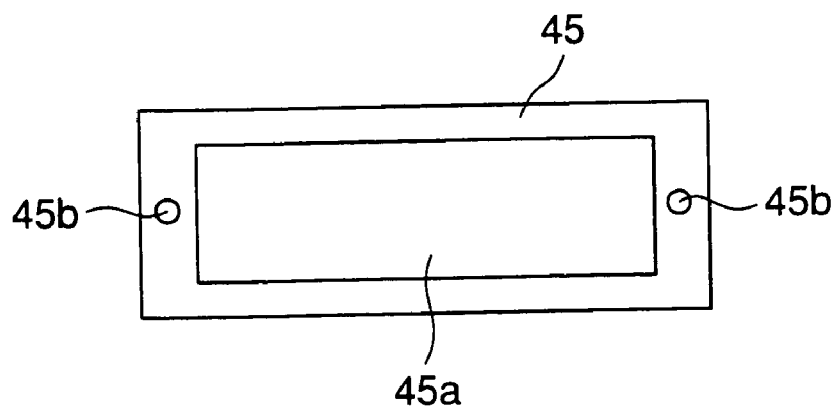
FIG. 13 is a plan view of an attachment frame to which the first and second filters shown in FIGS. 12A and 12B are affixed.

In order to attach the filter 4 to a predetermined position in each of the optical units 1L and 1R, as shown in FIGS. 12A and 12B, an adhesion portion 41c is provided on each longitudinal side portion of the first filter 41 and an adhesion portion 42c is provided on each longitudinal side portion of the second filter 42 so that the first and second filters 41 and 42 are superposed to be affixed to an attachment frame 45 made of a sheet metal shown in FIG. 13.

The attachment frame 45 has formed therein a rectangular window 45a for restricting the transmission region of the light beam and a pair of holes 45b through which pass screws for attaching the attachment frame 45 to a support member of each of the optical units 1L and 1R.

Therefore, by inserting the screws into a pair of the holes 45b, the attachment frame 45 to which the filter 4 is affixed can be fixed to the support member of each of the optical units 1L and 1R.

As the adhesion portion 41c or 42c, a double-sided tape or an adhesive agent can be employed. It is preferable that each of the adhesion portions 41c and 42c be made as thin and narrow as possible. Further, the first and second filters 41 and 42 are required to be affixed or fixed so that the incident light beam is precluded from passing through each of the adhesion portions 41c and 42c to prevent the transmission rate of the filter 4 from becoming inaccurate.

Next, a description will be given, with reference to FIG. 14, of a third embodiment of the filter 4.

The filter 4 of this embodiment is a combination of three filters 46 through 48 having different optical transmission rates and longitudinal lengths. The filters 46 through 48 include wedge-like notches 46a, 47a, and 48a of the same depth protruding from each longitudinal end portion toward each center portion thereof.

The longest filter 46 has a transmission rate of 25%, the second longest filter 47, whose longitudinal ends are indicated by one dot chain lines, has a transmission rate of 50%, and the shortest filter 48, whose longitudinal ends are indicated by broken lines, has a transmission rate of 75%. The transmission rate of the filter 4 varies slightly along the length thereof, so that a variation in the transmission rate becomes smoother.

Figure 14:
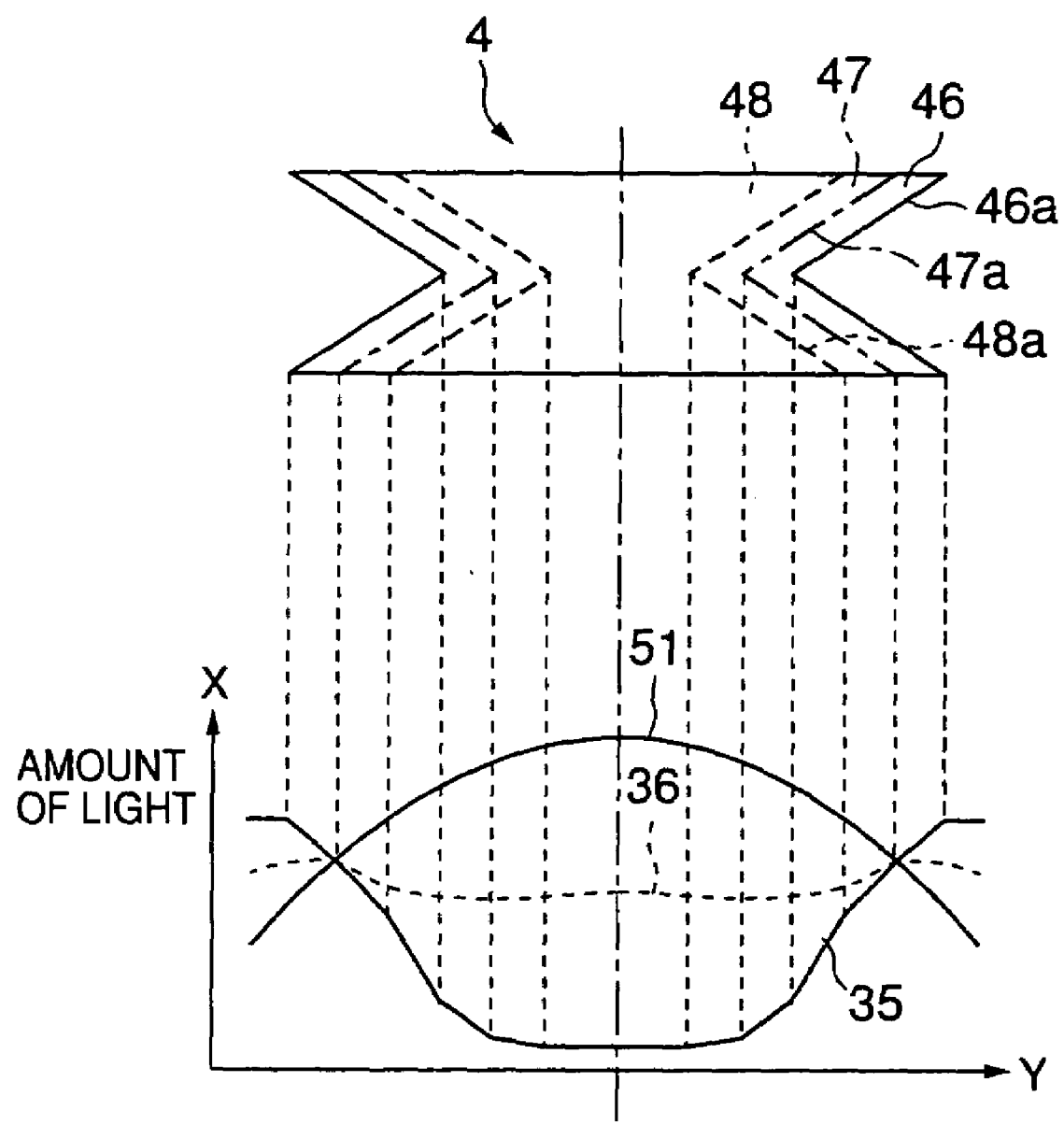
FIG. 14 is a diagram showing a structure and a characteristic of a third embodiment of the filter according to the present invention.

Thus, if a light beam is made incident on the filter 4 so that its amount of light is distributed uniformly all over the filter 4, the light beam passing through the filter 4 has its amount of light distributed in the Y-axial direction with a characteristic indicated by a curve 35 in FIG. 14.

However, an actual light beam made incident on the filter 4 does not have its amount of light distributed uniformly in the Y-axial direction, and therefore, the distribution of the amount of light has the characteristic indicated by the curve 51 in FIG. 14 as in the conventional example described with reference to FIG. 1. Therefore, if the light beam having such a distribution of the amount of light passes through the filter 4 of this embodiment, due to the transmission rate distribution of the filter 4, the distribution of the amount of light is averaged as indicated by a broken curve 36 in FIG. 14 to be almost uniform in the Y-axial direction.

The optical transmission rates of the three filters 46 through 48 can be set so as to correct not only the distribution of the amount of light of the incident light beam but also a characteristic of the condenser lens 12 shown in FIG. 2 or a sensitivity characteristic of each of the CCDs 13L and 13R. The same transmission rate may be employed by the three or two of the filters 46 through 48, or the three filters 46 through 48 may have different transmission rates as described above. Each transmission rate can be selected freely from the range of more than 0% to less than 100%.

Further, the number of employed filters and the transmission rate, shape, and material (resin film, glass, plastic, etc.) of each employed filter can be freely combined so that a desired characteristic can be obtained.

The filter 4 may be disposed in any position in each of the optical paths through which the light beams projected from the light emitting parts 6 of the optical units 1L and 1R are reflected back from the retroreflective sheet 2 to be received by the respective light receiving parts 7. However, the closer the filter 4 is disposed to the light receiving surface 13a of each of the CCDs 13L and 13R of the light receiving parts 7, the smaller the longitudinal dimension of the filter 4 can be made. Further, the filter 4 may be provided on the side of each of the light emitting parts 6.

Finally, a description will be given, with reference to FIG. 15, of an embodiment of an information display and input apparatus including the coordinate input and detection device according to the present invention.

Figure 15:
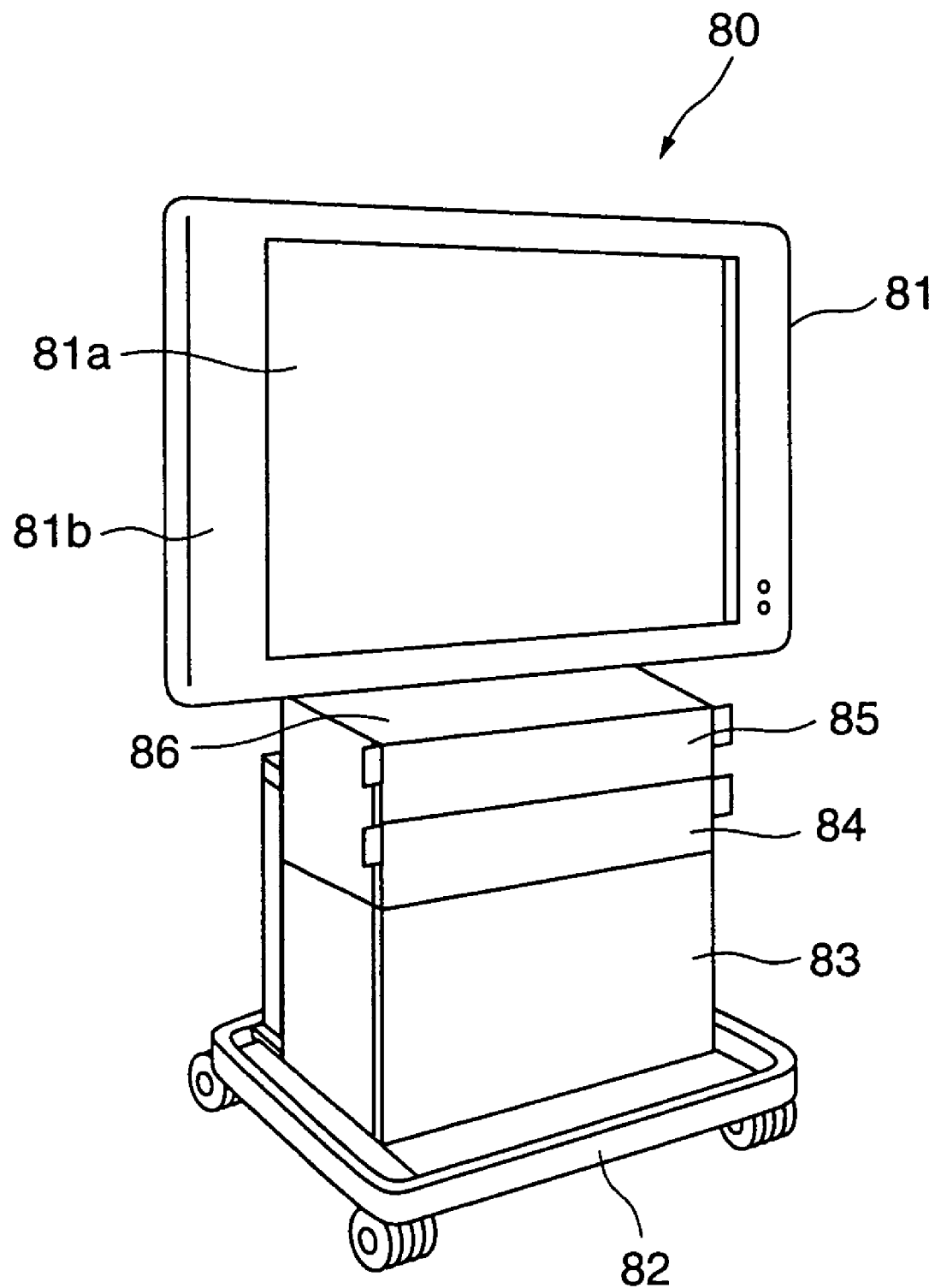
FIG. 15 is a perspective view of an embodiment of an information display and input apparatus according to the present invention.

FIG. 15 is a perspective front-side view of a multimedia board that is the information display and input apparatus.

The multimedia board 80 includes a board part 81, which is used as a large screen display for displaying a variety of information and also as a touch panel of the above-described coordinate input and detection device, a computer housing part 83 provided on a caster board 82, a video deck housing part 84 provided on the computer housing part 83, and a printer housing part 85 provided on the video deck housing part 84. The board part 81 is supported by a pillar provided on its backside to be provided on the printer housing part 85. The upper surface of the printer housing part 85 is also used as a keyboard stand 86 for placing a keyboard (not shown) thereon.

The board part 81 includes a plasma color display that is an information display unit employing a large screen flat panel 81*a*, and the above-described coordinate input and detection device incorporated into the plasma color display. The flat panel 81*a* is also used as the above-described touch panel 10, and the above-described pair of the optical units 1L and 1R are housed inside the left and right corner portions of the lower portion of a frame body 81*b* of the board part 81, respectively. The retroreflective sheet 2 is provided on the periphery of the flat panel 81*a* except for the bottom side thereof.

A drive unit of the plasma color display and a controller unit of the coordinate input and detection device, which unit includes the operation part 20 shown in FIG. 3, are provided on the backside of the board part 81.

According to the multimedia board 80, when information is freely written to or an indication is freely provided on the screen of the flat panel 81*a* by means of a finger or a pen, the as-written information or information corresponding to the indication can be displayed on the projector-like large screen of the board part 81, and the information or the indication can be inputted to a computer housed in the computer housing part 83. Further, a sharp color image based on data from the computer or reproduced image data from a video deck housed in the video deck housing part 84 can be displayed on the large screen of the board part 81. In addition, information displayed on the screen can be printed out on sheets of paper from a printer housed in the printer housing part 85.

Since information written to the screen of the board part 81 is managed by the page by letting one screen be one page, it is easy to display a list of all the pages of information displayed on the screen, to rearrange pages, or to make an edition such as deletion or addition of pages. It is also possible to store the created pages as files.

Therefore, the multimedia board 80 serves as a very convenient tool for a conference, meeting or presentation. The keyboard may be connected to the computer to utilize the board part 81 as a conventional display screen of the computer so that the board part 81 can be used for providing instructions on a computer operation.

According to this embodiment, the flat panel 81*a* of the board part 81 is also used as the touch panel. However, a touch panel made of a transparent material may be provided on the flat panel 81*a* to serve as the touch panel of the coordinate input and detection device.

The present invention is not limited to the specifically disclosed embodiments, but variations and modifications may be made without departing from the scope of the present invention.

The present application is based on Japanese priority application No. 2000-096991 filed on Mar. 31, 2000, the entire contents of which are hereby incorporated by reference.

What is claimed is:

1. A coordinate input and detection device comprising:
a touch panel including a surface;
a plurality of light emitting units projecting light beams traveling parallel to the surface of said touch panel over a predetermined region of said touch panel, each of the light beams being a parallel beam having a uniform thickness in a direction perpendicular to the surface of said touch panel and having a sector shape in a direction parallel to the surface of said touch panel;
a reflective member provided on a peripheral portion of said touch panel to reflect the light beams toward first optical paths through which the respective light beams travel to reach said reflective member;
a plurality of intensity distribution detection units receiving the respective light beams reflected by said reflective member to detect intensity distributions of the light beams; and
a plurality of filters disposed in respective second optical paths in directions perpendicular to directions in which the respective light beams travel, the second optical paths being optical paths through which the respective light beams reflected by said reflective member travel to reach said respective intensity distribution detection units, said filters having transmission rates varying with respect to positions within said filters.

2. An information display and input apparatus comprising:
an information display unit including a display for displaying a variety of information; and
a coordinate input and detection device, the device comprising:
a touch panel including a surface, the touch panel serving as the display of said information display unit;
a plurality of light emitting units projecting light beams traveling parallel to the surface of said touch panel over a predetermined region of said touch panel, each of the light beams being a parallel beam having a uniform thickness in a direction perpendicular to the surface of said touch panel and having a sector shape in a direction parallel to the surface of said touch panel;
a reflective member provided on a peripheral portion of said touch panel to reflect the light beams toward first optical paths through which the light beams travel to reach said reflective member;
a plurality of intensity distribution detection units receiving the respective light beams reflected by said reflective member to detect intensity distributions of the light beams; and
a plurality of filters disposed in respective second optical paths in directions perpendicular to directions in which the respective lights beams travel, the second optical paths being optical paths through which the respective light beams reflected by said reflective member travel to reach said respective intensity distribution detection units, said filters having transmission rates varying with respect to positions within said filters.

3. A coordinate input and detection device comprising;
a touch panel including a surface;
a plurality of light emitting means for projecting light beams traveling parallel to the surface of said touch panel over a predetermined region of said touch panel, each of the light beams being a parallel beam having a uniform thickness in a direction perpendicular to the surface of said touch panel and having a sector shape in a direction parallel to the surface of said touch panel;

reflective means provided on a peripheral portion of said touch panel for reflecting the light beams toward first optical paths through which the respective light beams travel to reach said reflective means;

a plurality of intensity distribution detection means for receiving the respective light beams reflected by said reflective means to detect intensity distributions of the light beams; and a plurality of filter means disposed in respective second optical paths in directions perpendicular to directions in which the respective light beams travel, the second optical paths being optical paths through which the respective light beams reflected by said reflective means travel to reach said respective intensity distribution detection means, said filter means having transmission rates varying with respect to positions within said filter meats.

* * * * *